(12) United States Patent
Yamamoto

(10) Patent No.: US 9,896,052 B2
(45) Date of Patent: Feb. 20, 2018

(54) CARGO BED AND UTILITY VEHICLE WITH THE CARGO BED

(71) Applicant: KAWASAKI JUKOGYO KABUSHIKI KAISHA, Hyogo (JP)

(72) Inventor: Teruaki Yamamoto, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,643

(22) Filed: Dec. 30, 2014

(65) Prior Publication Data

US 2016/0185398 A1    Jun. 30, 2016

(51) Int. Cl.
| | |
|---|---|
| *B62D 33/08* | (2006.01) |
| *B60R 21/13* | (2006.01) |
| *B62D 33/02* | (2006.01) |
| *B60P 7/15* | (2006.01) |

(52) U.S. Cl.
CPC ............. *B60R 21/13* (2013.01); *B60P 7/15* (2013.01); *B62D 33/02* (2013.01); *B62D 33/08* (2013.01)

(58) Field of Classification Search
CPC ........ B62D 33/08; B62D 33/02; B60R 21/13; B60P 7/15; B60P 7/135

USPC .................... 296/183.1, 37.6, 182.1; 410/140
See application file for complete search history.

(56) References Cited

U.S. PATENT DOCUMENTS

| | | | | |
|---|---|---|---|---|
| 6,015,178 | A * | 1/2000 | Haack ..................... | B60R 13/01 296/39.2 |
| 7,971,919 | B2 * | 7/2011 | Vertanen ................... | B60P 3/40 296/3 |
| 8,317,442 | B2 * | 11/2012 | Daikuzono ........... | B60P 7/0892 410/121 |

FOREIGN PATENT DOCUMENTS

JP          2011-20574          2/2011

* cited by examiner

*Primary Examiner* — Joseph D Pape
*Assistant Examiner* — Dana Ivey
(74) *Attorney, Agent, or Firm* — Wenderoth, Lind & Ponack, L.L.P.

(57) ABSTRACT

A cargo bed of a utility vehicle includes a front wall, a left wall, a right wall, a rear wall, and a partition member configured to partition a storage space that is surrounded by the front wall, the left wall, the right wall, and the rear wall. The left wall and the right wall are each provided with a first groove configured to be engaged with the partition member to fix the same, and a second groove configured to store the partition member.

4 Claims, 5 Drawing Sheets

CARGO BED AND UTILITY VEHICLE WITH THE CARGO BED

BACKGROUND OF THE INVENTION

1. Field of the Invention

The present invention relates to a utility vehicle, and particularly to a cargo bed of the utility vehicle.

2. Description of the Related Art

A conventional cargo bed of a utility vehicle includes front and rear walls, right and left side walls, and a partition member configured to partition a storage space that is surrounded with the front and rear walls and the right and left side walls. The right and left side walls are each provided with an engagement portion configured to be engaged with the partition member to fix the same. The partition member engaged with the engagement portions suppresses cargo on the cargo bed from shifting in the storage space.

Though not for a utility vehicle, a vehicle cargo bed structure according to the prior art disclosed in JP Laid-open Publication No. 2011-20574 includes a cargo bed having right and left side panels and an open top, and a current plate serving as a partition member. The right and left side panels of the cargo bed have a plurality of paired grooves in the inner surfaces of the side panels in the vehicle width direction and in the anteroposterior direction of the cargo bed. The current plate can be selectively inserted to a pair out of the plurality of paired grooves.

The conventional cargo bed of a utility vehicle does not have any storage space for the partition member not in use. There accordingly arise problems that the partition member not in use is troublesomely unloaded from the cargo bed or is kept engaged with the engagement portions to decrease an actually available range in the cargo bed.

SUMMARY OF THE INVENTION

The present invention has been made in view of the problems mentioned above, and an object thereof is to provide a cargo bed of utility vehicle, which allows a partition member to be easily stored in the cargo bed and can prevent decrease in actually available range in the cargo bed.

In order to achieve the object mentioned above, the present invention provides a cargo bed of a utility vehicle, including: a front wall; right and left side walls; a rear wall; and a plurality of partition members configured to partition a storage space surrounded with the front wall, the right and left side walls, and the rear wall; wherein the front and rear walls and the right and left side walls, or the front and rear walls or the right and left side walls, are each provided with an engagement portion configured to be engaged with one of the partition members to fix the same, and a storage portion configured to store the plurality of partition members.

According to the present invention, the front and rear walls and/or the right and left side walls are provided with the storage portions that can store the plurality of partition members. The partition members not in use neither are unloaded from the cargo bed nor are kept engaged with the engagement portions, but can be stored in the storage portions. The partition members can be easily stored in the cargo bed to prevent decrease in actually available range in the cargo bed.

The present invention can preferably adopt any the following configurations in addition to the configuration described above.

(a) When the storage portion is provided to each of the right and left side walls, the storage portion is provided to at least an end in an anteroposterior direction of each of the right and left side walls, and when the storage portion is provided to each of the front and rear walls, the storage portion is provided to at least an end in a vehicle width direction of each of the front and rear walls.

In the configuration (a), the storage portion is provided to at least an end of each of the right and left side walls in the anteroposterior direction or to at least an end of each of the front and rear walls in the vehicle width direction. The partition members can thus be stored at the end of the storage space in the cargo bed to increase the actually available range in the cargo bed.

(b) The storage portion is provided with a plurality of convex portions, and the partition members are each provided with a concave portion configured to be engaged with the convex portion of the storage portion.

In the configuration (b), the convex portions of the storage portion and the concave portions of the partition members are engaged with each other. The partition members can thus be stored in the storage portion easily and reliably.

(c) The partition members include a vehicle width member extending in a vehicle width direction between the right and left side walls, and an anteroposterior member extending in an anteroposterior direction between the front and rear walls, and one of the vehicle width member and the anteroposterior member is laid on another one of the vehicle width member and the anteroposterior member.

In the configuration (c), the vehicle width member and the anteroposterior member cross each other. This configuration achieves finer partition of the storage space in comparison to a case where the storage space is partitioned only by the vehicle width member or the anteroposterior member.

The present invention also provides a utility vehicle including: a chassis; a single or plurality of seat rows provided on the chassis; a R.O.P.S. surrounding a riding space accommodating the seat rows; and the cargo bed provided behind the seat rows.

With the cargo bed according to the present invention, the partition members can be easily stored in the cargo bed to prevent decrease in actually available range in the cargo bed.

DETAILED DESCRIPTION OF THE INVENTION

FIGS. 1 to 7 each show a utility vehicle according to the present invention. A preferred embodiment of the present invention will now be described with reference to these figures. For easier description, assume that the utility vehicle travels "forward" with respect to the utility vehicle and respective components, and right and left sides of a crew directed forward correspond to "right and left sides" of the utility vehicle and these components.

Figure 1:
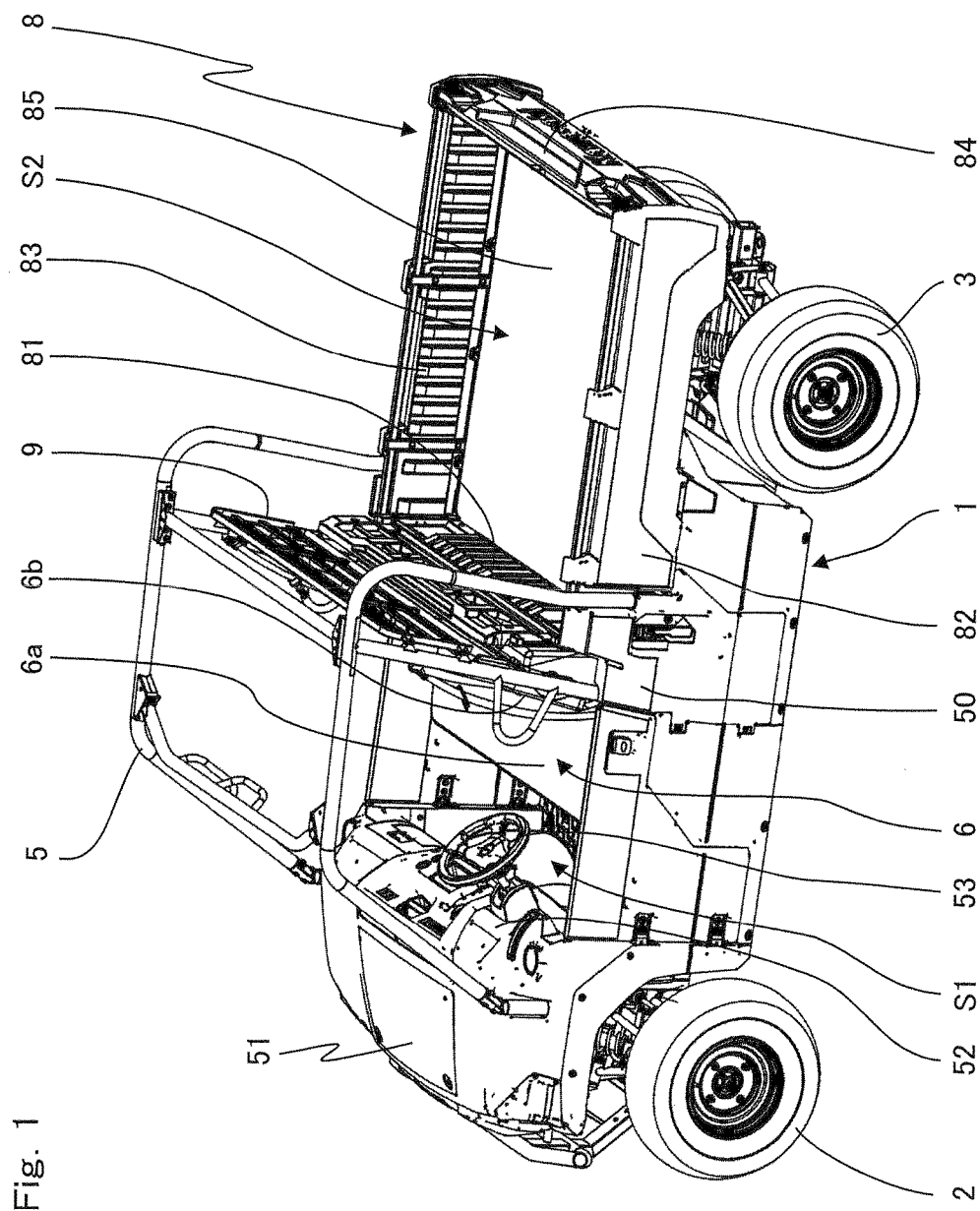
FIG. 1 is a perspective view viewed from diagonally rear left, of a utility vehicle according to the present invention.

FIG. 1 is a perspective view viewed from diagonally rear left, of the utility vehicle according to the present invention. The utility vehicle mainly travels on grass fields, gravel ground, and sandy soil, as well as on wild lands such as unpaved mountain paths or forest roads, muddy places, and craggy places.

As shown in FIG. 1, the utility vehicle includes a chassis 1 that has a front portion provided with a pair of right and left front wheels 2 and a rear portion provided with a pair of right and left rear wheels 3. The chassis 1 is provided, at the lateral ends, with side covers 50 covering lateral portions of the chassis 1. A riding space S1 is provided between the front wheels 2 and the rear wheels 3 and is surrounded with a R.O.P.S. 5. The R.O.P.S. is an abbreviation for a rollover protective structure. The riding space S1 accommodates a bench seat 6. The seat 6 configures a single seat row. The seat 6 is provided therebehind with a cargo bed 8. A screen 9 is provided between the riding space S1 and the cargo bed 8. The riding space S1 is provided thereahead with a bonnet 51. The bonnet 51 is provided, at the upper rear end, with a dashboard 52. The dashboard 52 is provided with a steering wheel 53 and a shift lever (not shown) in an operable range for a driver seated in a driver's region 6a of the seat 6.

The cargo bed 8 extends backward beyond the rear wheels 3 and substantially horizontally from the vicinity of a backrest 6b of the seat 6. The cargo bed 8 includes a front wall 81, a left wall 82, a right wall 83, a rear wall 84, a bottom plate 85, and partition members (not shown). The front wall 81 and the rear wall 84 extend in parallel with each other in the vehicle width direction and stand perpendicularly from the bottom plate 85. The left wall 82 and the right wall 83 extend in parallel with each other in the anteroposterior direction and stand perpendicularly from the bottom plate 85. The bottom plate 85 has a substantially rectangular shape. The front wall 81, the left wall 82, the right wall 83, the rear wall 84, and the bottom plate 85 surround a storage space S2 that has a substantially rectangular parallelepiped shape and stores cargo or the like.

Figure 2:
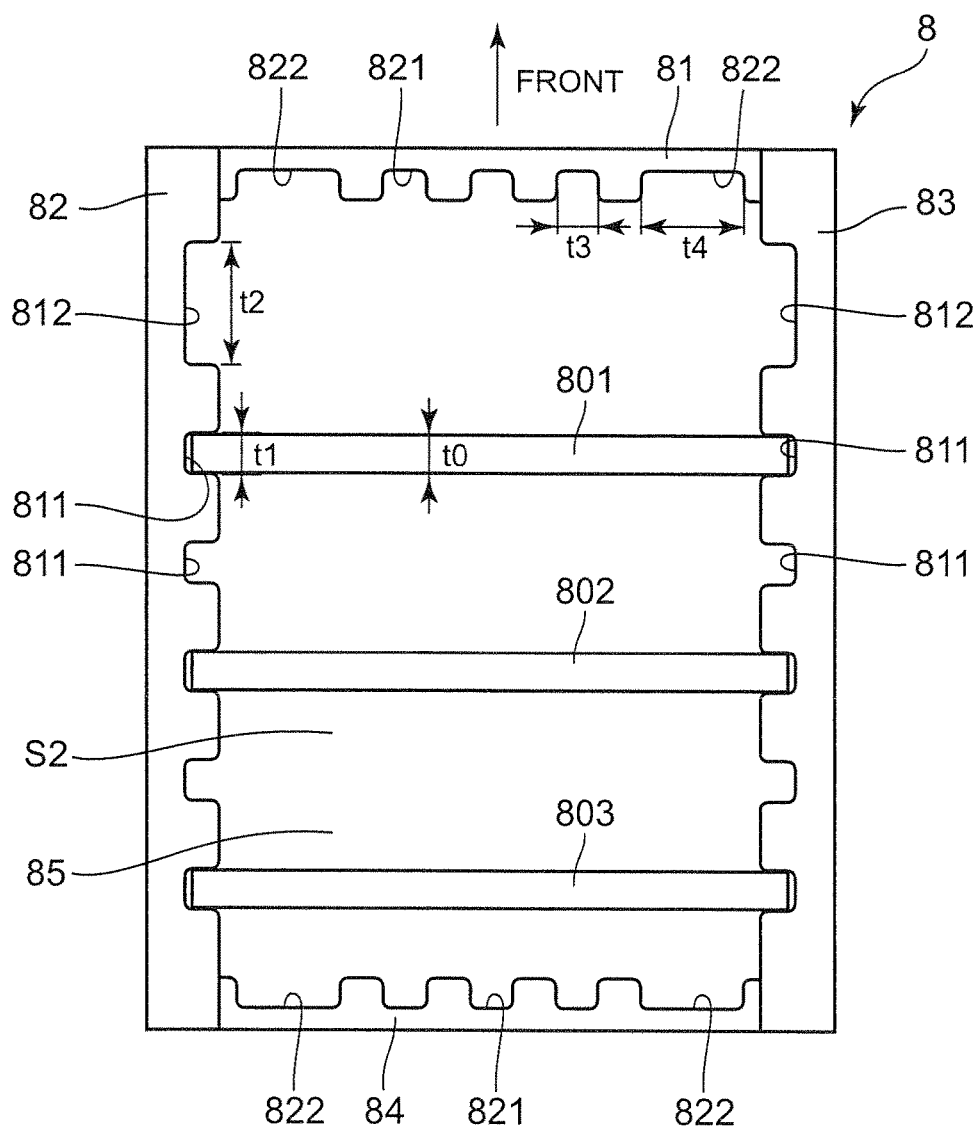
FIG. 2 is a plan view schematically showing a state where partition members are attached to a cargo bed of the utility vehicle.

FIG. 2 is a plan view schematically showing a state where the partition members are attached to the cargo bed 8 of the utility vehicle.

As shown in FIG. 2, three partition members 801 to 803 are provided between the left wall 82 and the right wall 83 at the center and rear portions in the cargo bed 8 in the anteroposterior direction.

The three partition members 801 to 803 extend in parallel with the front wall 81 and the rear wall 84, in other words, extend in the vehicle width direction, and partition the storage space S2. The partition members 801 to 803 are provided as plate members each having a thickness t0. The thickness t0 ranges from 5 mm to 100 mm, for example. The partition members 801 to 803 are substantially as tall as the left wall 82 and the right wall 83 from the bottom plate 85.

The left wall 82 and the right wall 83 of the cargo bed 8 each have an inner surface in the vehicle width direction provided with a plurality of first grooves 811 and a single second groove 812, which are each recessed outward in the vehicle width direction in a cornered U shape. The first and second grooves 811 and 812 extend perpendicularly to the bottom plate 85.

The first grooves 811 in the left wall 82 and the first grooves 811 in the right wall 83 face each other in the anteroposterior direction. The first grooves 811 each have a width t1 in the anteroposterior direction, which is substantially equal to the thickness t0 of the partition members 801 to 803. When the respective ends of the partition members 801 to 803 are engaged with the first grooves 811, the partition members 801 to 803 are fixed to the left wall 82 and the right wall 83. The first grooves 811 thus serve as engagement portions that are engaged with the partition members 801 to 803 to fix the same.

The second groove 812 in the left wall 82 is located near the front end of the left wall 82, in other words, ahead of the first grooves 811. The second groove 812 in the right wall 83 is located near the front end of the right wall 83, in other words, ahead of the first grooves 811. The second groove 812 in the left wall 82 and the second groove 812 in the right wall 83 face each other. The second grooves 812 each have a width t2 in the anteroposterior direction, which is substantially three times the width t1 of the first grooves 811 in the anteroposterior direction.

The front wall 81 and the rear wall 84 of the cargo bed 8 each have an inner surface in the anteroposterior direction provided with a plurality of third grooves 821 and two fourth grooves 822, which are each recessed outward in the anteroposterior direction in a cornered U shape. The third and fourth grooves 821 and 822 extend perpendicularly to the bottom plate 85.

The third grooves 821 in the front wall 81 are located at the center portion of the front wall 81 in the vehicle width direction. The third grooves 821 in the rear wall 84 are located at the center portion of the rear wall 84 in the vehicle width direction. The third grooves 821 in the front wall 81 and the third grooves 821 in the rear wall 84 face each other in the vehicle width direction. The third grooves 821 each have a width t3 in the vehicle width direction, which is substantially equal to the thickness t0 of partition members (not shown). When the respective ends of the partition members are engaged with the third grooves 821, the partition members are fixed to the front wall 81 and the rear wall 84. The third grooves 821 thus serve as engagement portions that are engaged with the partition members to fix the same.

Respective fourth grooves 822 in the front wall 81 are located at the ends of the front wall 81 in the vehicle width direction. Respective fourth grooves 822 in the rear wall 84 are located at the ends of the rear wall 84 in the vehicle width direction. The fourth grooves 822 in the front wall 81 and the fourth grooves 822 in the rear wall 84 face each other. The fourth grooves 822 each have a width t4 in the vehicle width direction, which is substantially twice the width t3 of the third grooves 821 in the vehicle width direction.

Figure 3:
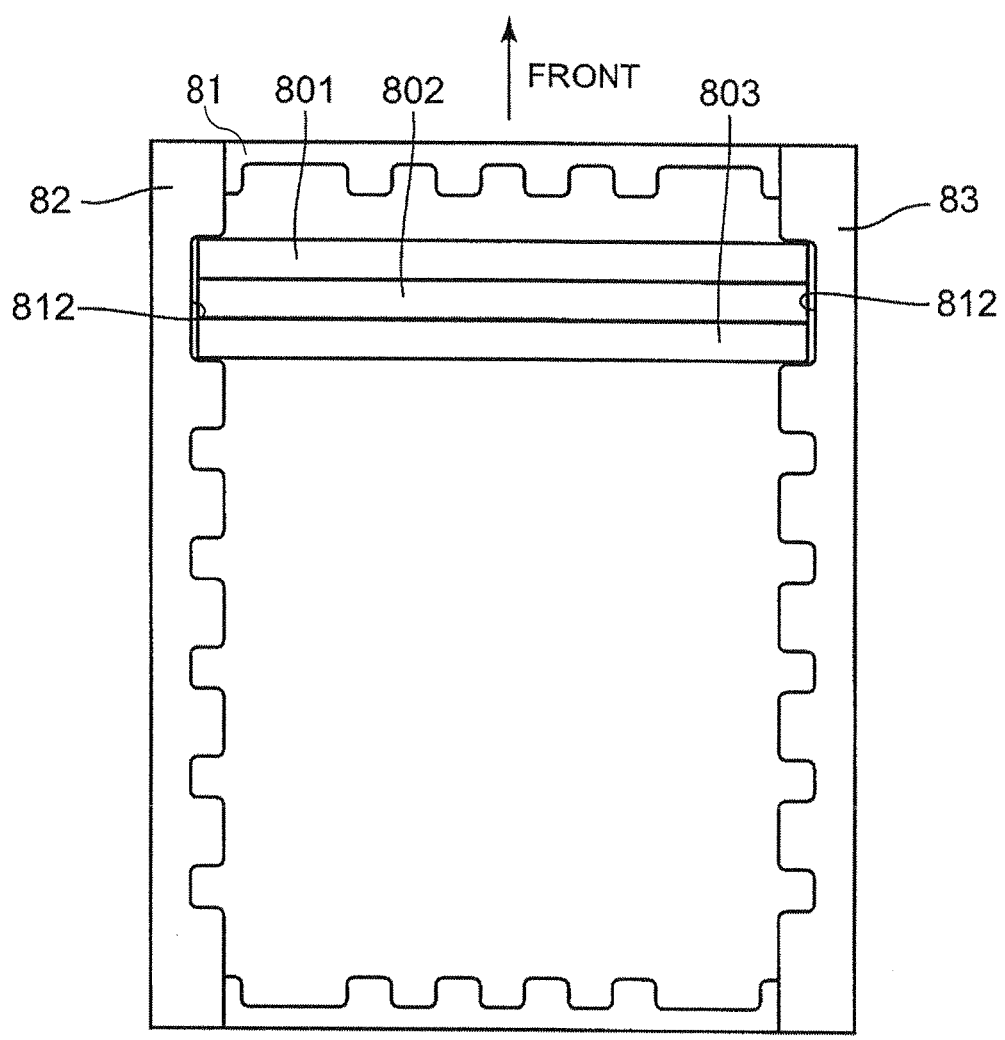
FIG. 3 is a plan view schematically showing a state where the partition members are stored in storage portions of the cargo bed.
Figure 4:
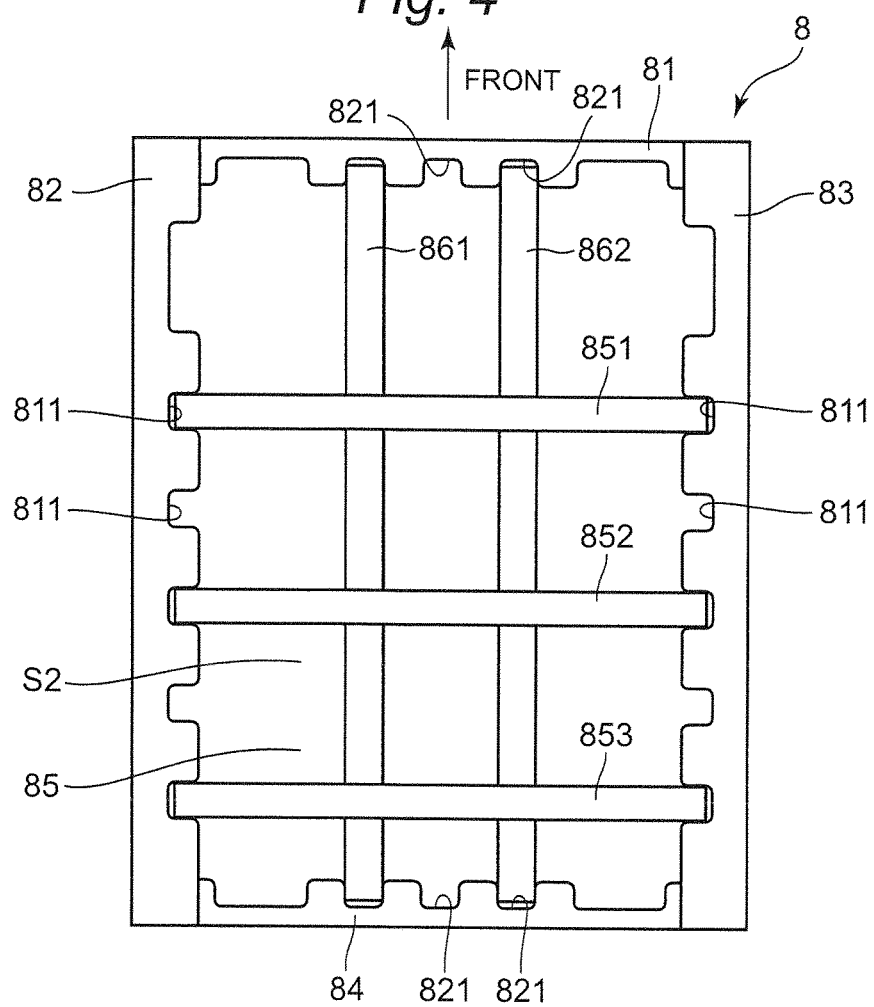
FIG. 4 is a plan view schematically showing a state where the partition members are stored in storage portions provided in right and left side walls, a front wall, and a rear wall of the cargo bed.
Figure 5:
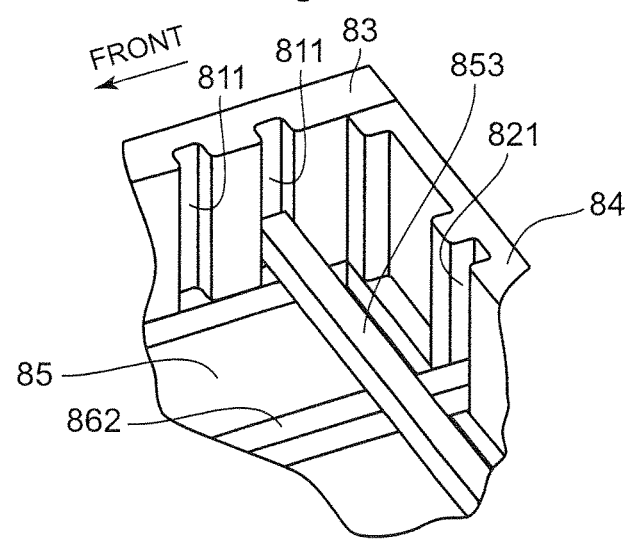
FIG. 5 is a partially enlarged perspective view viewed from diagonally front left, of part of the region shown in FIG. 4.
Figure 6:
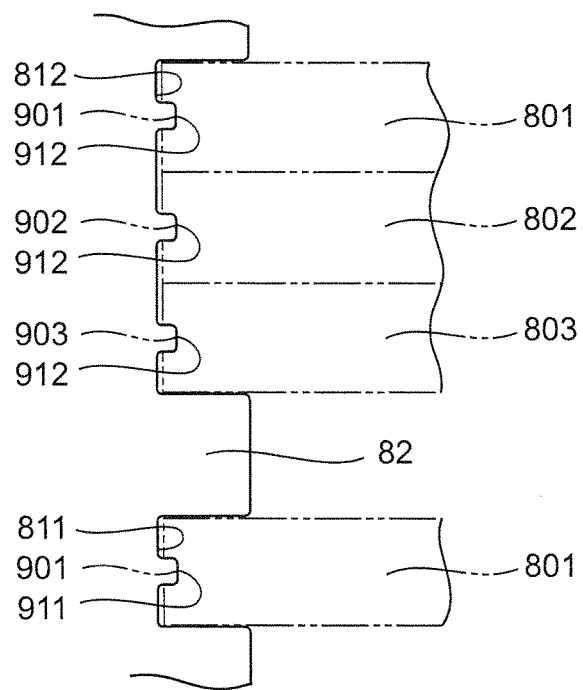
FIG. 6 is an explanatory partial plan view of the cargo bed according to a modification example.
Figure 7:
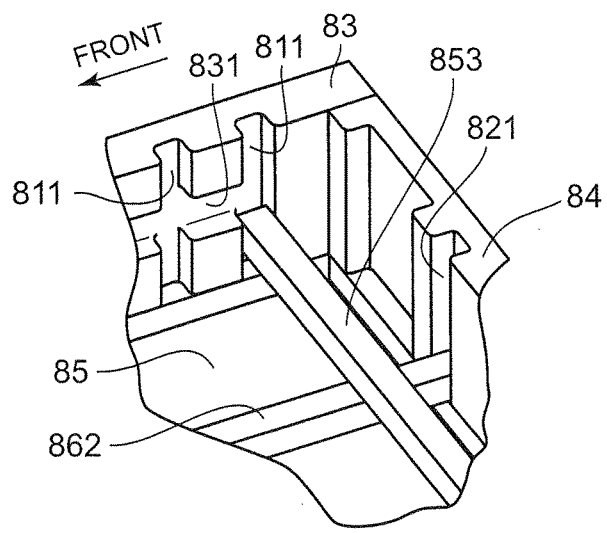
FIG. 7 is an explanatory partially enlarged perspective view of the cargo bed according to another modification example.

FIG. 3 is a plan view schematically showing a state where the partition members 801 to 803 are stored at the second grooves 812 in the cargo bed 8.

As shown in FIG. 3, the partition members 801 to 803 are stacked and extend substantially in parallel with the front wall 81. The respective ends of the partition members 801 to 803 are engaged with the second groove 812 in the left wall 82 and the second groove 812 in the right wall 83. The second grooves 812 thus serve as engagement portions that are engaged with the partition members 801 to 803 to store the same.

Alternatively, the two partition members extending in the anteroposterior direction can be stacked and extend substantially in parallel with the left wall 82 and the right wall 83 and the respective ends of the two partition members can be engaged with one of the fourth groove 822 in the front wall 81 and the opposite fourth groove 822 in the rear wall 84. The fourth grooves 822 thus serve as engagement portions that are engaged with the partition members to store the same.

Effects of the Embodiment (1) The left wall 82 and the right wall 83 are each provided with the second groove 812 that can store the plurality of partition members 801 to 803. The partition members 801 to 803 not in use neither are unloaded from the cargo bed 8 nor are kept engaged with the first grooves 811 serving as the engagement portions, but can be stored at the second grooves 812. The partition members 801 to 803 can be easily stored in the cargo bed 8 to prevent decrease in actually available range in the cargo bed 8.

(2) The second groove 812 is located near the front end in the anteroposterior direction, of each of the left wall 82 and the right wall 83. The partition members 801 to 803 can thus be stored at the end of the storage space S2 in the cargo bed 8 to increase the actually available range in the cargo bed 8.

Other Embodiments (1) The partition members 801 to 803 extend only in the vehicle width direction in the embodiment described above. The present invention is not limited to this configuration. As exemplified in FIGS. 4 and 5, partition members 861 and 862 can extend in the anteroposterior direction and the respective ends of the partition members 861 and 862 can be engaged with the third grooves 821 in the front wall 81 and the rear wall 84. Still alternatively, partition members 851 to 853 can extend in the vehicle width direction and be located above the partition members 861 and 862, and the respective ends of the partition members 851 to 853 can be engaged with the first grooves 811 in the left wall 82 and the right wall 83. Each of the partition members 851 to 853, 861, and 862 can be a bar member having a substantially square section with sides of 5 mm to 100 mm. The reference signs in FIGS. 4 and 5 same as those in FIG. 2 indicate the same configurations and will not be described repeatedly.

The partition members 851 to 853 and the partition members 861 and 862 cross each other as described above. This configuration achieves finer partition of the storage space S2 in comparison to a case where the storage space S2 is partitioned only by the partition members 851 to 853 or only by the partition members 861 and 862.

The partition members extending in the anteroposterior direction can be alternatively located above the partition members extending in the vehicle width direction.

(2) In the above embodiment, the left wall 82 and the right wall 83 of the cargo bed 8 each have the inner surface in the vehicle width direction provided with the plurality of first grooves 811 and the single second groove 812, which are each recessed outward in the vehicle width direction in the cornered U shape. The present invention is not limited to this configuration. As exemplified in FIG. 6, the first grooves 811 can be each provided, on the bottom surface, with a convex portion 911 projecting inward in the vehicle width direction, and the convex portion 911 can be engaged with a concave portion 901 that is provided in an end surface of the partition member 801. Still alternatively, the second groove 812 can be provided, on the bottom surface, with a plurality of convex portions 912 projecting inward in the vehicle width direction, and the convex portions 912 can be engaged respectively with concave portions 901 to 903 that are provided in end surfaces of the partition members 801 to 803.

The convex portions 912 in the second groove 812 are engaged with the concave portions 901 to 903 of the partition members 801 to 803. The partition members 801 to 803 can thus be stored in the second groove 812 easily and reliably. When the concave portion 901 of the partition member 801 is engaged with any one of the convex portions 912 in the second groove 812, only the partition member 801 can be stored in the second groove 812 easily and reliably.

Alternatively, the first grooves 811 can be each provided, in the bottom surface, with a concave portion recessed outward in the vehicle width direction, and the concave portion can be engaged with a convex portion that is provided on an end surface of the partition member 801.

(3) The first and third grooves 811 and 821 extend perpendicularly to the bottom plate 85 in the above embodiment. The present invention is not limited to this configuration. As exemplified in FIG. 7, the right wall 83 can be provided, at the center portion in the vertical direction, with a groove 831 extending in the anteroposterior direction. The reference signs in FIG. 7 same as those in FIG. 5 indicate the same configurations and will not be described repeatedly.

When the groove 831 extending in the anteroposterior direction is provided at the center portion of the right wall 83 in the vertical direction, the partition member 853 can be easily shifted forward through the groove 831. Specifically, in order to shift the partition member 853 forward, the partition member 853 is not required to be shifted to the uppermost end of the first groove 811 and be detached from the cargo bed 8.

(4) The second grooves 812 are located near the front ends of the left wall 82 and the right wall 83 of the cargo bed 8 in the above embodiment. The present invention is not limited to this configuration, and the second grooves 812 can be alternatively located near the rear ends of the left wall and the right wall. Still alternatively, the second grooves can be provided near the front and rear ends of the left wall and the right wall.

(5) The partition members 801 to 803 are provided as the plate members in the above embodiment. The present invention is not limited to this configuration, and the partition members can be provided as bar members, hollow pipe members, or the like each having a substantially circular or elliptical section.

(6) The partition members 801 to 803 are spaced apart from one another in the anteroposterior direction and extend in parallel with one another in the vehicle width direction in the above embodiment. The present invention is not limited to this configuration. For example, the partition members can be stacked in the vertical direction and the left or right ends of the partition members can be engaged with the same first groove.

(7) According to the above embodiment, the second grooves 812 each have the width t2 in the anteroposterior direction, which is substantially three times the width t1 of the first grooves 811 in the anteroposterior direction. The fourth grooves 822 each have the width t4 in the vehicle width direction, which is substantially twice the width t3 of the third grooves 821 in the vehicle width direction. The present invention is not limited to these configurations. Each of the second grooves can have a width in the anteroposterior direction, which is four or more times the width of the first grooves in the anteroposterior direction, or can have a width in the anteroposterior direction, which is twice the width thereof. The fourth grooves can each have a width in the vehicle width direction, which is three or more times the width of the third grooves in the vehicle width direction.

(8) The partition members 801 to 803 extend in parallel with the front wall 81 and the rear wall 84 of the cargo bed 8 in the above embodiment. The present invention is not limited to this configuration, and the partition members can extend and be slanted at a constant angle from the front wall and the rear wall.

(9) The seat 6 according to the above embodiment configures the single seat row. The utility vehicle can alternatively have two seat rows, or three or more seat rows.

(10) The present invention is not limited to the configurations according to the embodiment described above, but can include various modification examples devisable within the scope not departing from the features recited in the following patent claims.

What is claimed is:

1. A cargo bed of a utility vehicle, comprising:
    a front wall;
    right and left side walls;
    a rear wall; and
    a plurality of partition members configured to partition a storage space surrounded with the front wall, the right and left side walls, and the rear wall;
    wherein the front and rear walls and the right and left side walls, or the front and rear walls or the right and left side walls, are each provided with:
        an engagement portion configured to be engaged with one of the partition members to fix the same; and
        a storage portion configured to store the plurality of partition members, and
    wherein the partition members include:
        a vehicle width member extending in a vehicle width direction over the entire length between the right and left side walls and being a bar member having a substantially square section; and
        an anteroposterior member extending in an anteroposterior direction over the entire length between the front and rear walls and being a bar member having a substantially square section, and
    wherein the vehicle width member is laid on the anteroposterior member and/or the anteroposterior member is laid on the vehicle width member, and the vehicle width member and the anteroposterior member are directly contacted and cross each other and the vehicle width member and the anteroposterior member are placed below upper ends of the front wall, the rear wall, and the right and left side walls in a condition in which the vehicle width member and the anteroposterior member are engaged with the engagement portions and they partition the storage space.

2. The cargo bed of a utility vehicle according to claim 1, wherein
    when the storage portion is provided to each of the right and left side walls, the storage portion is provided to at least an end in an anteroposterior direction of each of the right and left side walls, and
    when the storage portion is provided to each of the front and rear walls, the storage portion is provided to at least an end in a vehicle width direction of each of the front and rear walls.

3. The cargo bed of a utility vehicle according to claim 1, wherein
    the storage portion is provided with a plurality of convex portions, and
    the partition members are each provided with a concave portion configured to be engaged with at least one of the convex portions of the storage portion.

4. A utility vehicle comprising:
    a chassis;
    at least one seat row provided on the chassis;
    a R.O.P.S. surrounding a riding space accommodating the at least one seat row; and
    the cargo bed according to claim 1, provided behind the at least one seat row.

* * * * *